United States Patent
Ljung et al.

(10) Patent No.: US 9,839,003 B2
(45) Date of Patent: *Dec. 5, 2017

(54) UE INITIATED STATIONARY INDICATOR FOR REDUCED PAGING

(71) Applicants: Sony Corporation, Tokyo (JP); Sony Mobile Communications Inc., Tokyo (JP)

(72) Inventors: Rickard Ljung, Helsingborg (SE); Linh Trang, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,419

(22) Filed: Oct. 10, 2016

(65) Prior Publication Data
US 2017/0034803 A1   Feb. 2, 2017

Related U.S. Application Data

(63) Continuation of application No. 14/663,582, filed on Mar. 20, 2015, now Pat. No. 9,510,321.
(Continued)

(51) Int. Cl.
*H04W 68/00*   (2009.01)
*H04W 68/02*   (2009.01)
(Continued)

(52) U.S. Cl.
CPC ......... *H04W 68/02* (2013.01); *H04W 64/006* (2013.01); *H04W 68/04* (2013.01); *H04W 68/06* (2013.01); *H04W 60/04* (2013.01)

(58) Field of Classification Search
CPC ... H04W 68/02; H04W 68/04; H04W 64/006; H04W 68/06; H04W 60/04
See application file for complete search history.

(56) References Cited

U.S. PATENT DOCUMENTS

2001/0049282 A1   12/2001   Ushiki et al.
2004/0066755 A1*   4/2004   Lin .................. H04L 25/022
                                                                370/252
(Continued)

FOREIGN PATENT DOCUMENTS

JP         H11331918 A     11/1999
JP         2010520712 A     6/2010
(Continued)

OTHER PUBLICATIONS

Wan, G. et al.: Cost reduction in location management using semi-realtime movement information:, Wireless Networks, ACM, 2 Penn Plaza, Suite 701—New York, USA, vol. 5, No. 4, Aug. 1, 1999, pp. 245-256, XP000859589, ISSN: 1022-0038, DOI: 10.1023/A:1019155212541.
(Continued)

*Primary Examiner* — Erin File
(74) *Attorney, Agent, or Firm* — James C. Edwards; Moore & Van Allen PLLC (57) ABSTRACT

The invention is directed to reducing paging overhead in a network. An exemplary method comprises: determining whether a user equipment (UE) is substantially stationary, wherein the UE is located in a first network cell associated with a network; in response to determining the UE is substantially stationary, transmitting an indicator to the network; determining whether the UE moves from the first network cell to a second network cell; and in response to determining the UE moves from the first network cell to the second network cell, transmitting updated location information associated with the UE to the network.

17 Claims, 5 Drawing Sheets

Related U.S. Application Data (60) Provisional application No. 61/969,227, filed on Mar. 23, 2014.

(51) Int. Cl.
*H04W 64/00* (2009.01)
*H04W 68/06* (2009.01)
*H04W 68/04* (2009.01)
*H04W 60/04* (2009.01)

(56) References Cited

U.S. PATENT DOCUMENTS

| | | | |
|---|---|---|---|
| 2006/0258386 A1 | 11/2006 | Jeong et al. | |
| 2007/0201583 A1* | 8/2007 | Yen | H04L 25/022 375/340 |
| 2008/0119209 A1 | 5/2008 | Upp | |
| 2008/0220782 A1 | 9/2008 | Wang et al. | |
| 2008/0310493 A1* | 12/2008 | Cohen | H04L 25/03114 375/232 |
| 2010/0296591 A1 | 11/2010 | Xu et al. | |
| 2011/0130141 A1 | 6/2011 | Frost et al. | |
| 2011/0194534 A1* | 8/2011 | Carmon | H04W 24/02 370/331 |
| 2012/0258755 A1 | 10/2012 | Harju et al. | |
| 2013/0150054 A1 | 6/2013 | Axmon et al. | |
| 2013/0225169 A1* | 8/2013 | Farnsworth | H04W 60/04 455/436 |
| 2013/0244669 A1 | 9/2013 | Das et al. | |
| 2014/0022974 A1* | 1/2014 | Eriksson | H04W 56/0005 370/311 |
| 2014/0185475 A1 | 7/2014 | Ji et al. | |
| 2015/0163639 A1* | 6/2015 | Kilpatrick, II | H04W 4/028 455/456.1 |
| 2015/0215978 A1 | 7/2015 | Casati et al. | |
| 2015/0289229 A1 | 10/2015 | Ahluwalia et al. | |

FOREIGN PATENT DOCUMENTS

| | | |
|---|---|---|
| WO | 2008112161 A2 | 9/2008 |
| WO | 2013050067 A1 | 4/2013 |

OTHER PUBLICATIONS

International Search Report and Written Opinion; dated Jul. 13, 2015; issued in International Patent Application No. PCT/EP2015/055980.

International Preliminary Report on Patentability; dated Oct. 6, 2016; issued in International Patent Application No. PCT/EP2015/055980.

Japanese Patent Office; Office Action; dated Aug. 15, 2017; issued in Japanese Patent Application No. 2016-558329.

* cited by examiner

UE INITIATED STATIONARY INDICATOR FOR REDUCED PAGING

BACKGROUND

In order to improve network efficiency, there is a need to reduce the amount of paging overhead in a network.

BRIEF SUMMARY

Embodiments of the invention are directed to a system, method, and computer program product for reducing paging overhead in a network. An exemplary method comprises: determining whether a user equipment (UE) is substantially stationary, wherein the UE is located in a first network cell associated with a network; in response to determining the UE is substantially stationary, transmitting an indicator to the network; determining whether the UE moves from the first network cell to a second network cell; and in response to determining the UE moves from the first network cell to the second network cell, transmitting updated location information associated with the UE to the network.

In some embodiments, the network comprises a network backbone.

In some embodiments, the UE is substantially stationary if the UE is not moving or has limited movement.

In some embodiments, the UE is substantially stationary if the UE determines that it will remain stationary for a certain period.

In some embodiments, the network transmits a paging signal to the first network cell, but not the second network cell, when the UE is substantially stationary.

In some embodiments, the network transmits a paging signal to the first network cell and the second network cell when the UE moves from the first network cell to the second network cell.

In some embodiments, the second network cell is associated with the same or different geographical area when compared to the first network cell.

In some embodiments, determining whether the UE moves from the first network cell to the second network cell comprises periodically determining whether the UE moves from the first network cell to the second network cell.

In some embodiments, determining whether the UE moves from the first network cell to the second network cell comprises determining, by the UE, whether the UE moves from the first network cell to the second network cell.

In some embodiments, determining whether the UE moves from the first network cell to the second network cell comprises determining, by the network, whether the UE moves from the first network cell to the second network cell.

In some embodiments, the method further comprises: determining whether the UE moves from the first network cell to a third network cell, wherein the third network cell is not associated with a different geographical area from the first network cell; and in response to determining the UE moves from the first network cell to the third network cell, not transmitting updated location information associated with the UE to the network.

In some embodiments, the network is associated with the $3^{rd}$ Generation Partnership Project (3GPP).

In some embodiments, the UE comprises a mobile device.

In some embodiments, a system is provided for reducing paging overhead in a network. The system comprises: a memory; a processor; a module stored in the memory, executable by the processor, and configured to perform: determining whether a user equipment (UE) is substantially stationary, wherein the UE is located in a first network cell associated with a network; in response to determining the UE is substantially stationary, transmitting an indicator to the network; determining whether the UE moves from the first network cell to a second network cell; and in response to determining the UE moves from the first network cell to the second network cell, transmitting updated location information associated with the UE to the network.

In some embodiments, a computer program product is provided for reducing paging overhead in a network. The computer program product comprises a non-transitory computer-readable medium comprising code configured to perform: determining whether a user equipment (UE) is substantially stationary, wherein the UE is located in a first network cell associated with a network; in response to determining the UE is substantially stationary, transmitting an indicator to the network; determining whether the UE moves from the first network cell to a second network cell; and in response to determining the UE moves from the first network cell to the second network cell, transmitting updated location information associated with the UE to the network.

In some embodiments, a method is provided for reducing paging overhead in a network. The method comprises: receiving, by the network, an indicator from a user equipment (UE), wherein the indicator indicates the UE is substantially stationary; in response to receiving the indicator, transmitting a paging signal to the first network cell; receiving updated location information from the UE, wherein the updated location information indicates that the UE has moved from the first network cell to a second network cell (e.g., wherein the second network cell is associated with a different geographical area from the first network cell); and in response to determining the UE has moved from the first network cell to the second network cell, transmitting the paging signal to the first network cell and the second network cell.

In some embodiments, the method further comprises receiving updated location information from the UE, wherein the updated location information indicates that the UE has moved from the first network cell to a third network cell, wherein the third network cell associated with the same geographical area as the first network cell; and in response to determining the UE has moved from the first network cell to the third network cell, transmitting the paging signal to the geographical area comprising the first network cell and third network cell.

In some embodiments, a system is provided for reducing paging overhead in a network. The system comprises: a memory; a processor; a module stored in the memory, executable by the processor, and configured to perform: receiving, by the network, an indicator from a user equipment (UE), wherein the indicator indicates the UE is substantially stationary; in response to receiving the indicator, transmitting a paging signal to the first network cell; receiving updated location information from the UE, wherein the updated location information indicates that the UE has moved from the first network cell to a second network cell; and in response to determining the UE has moved from the first network cell to the second network cell, transmitting the paging signal to the first network cell and the second network cell.

In some embodiments, a computer program product is provided for reducing paging overhead in a network. The computer program product comprises a non-transitory computer-readable medium comprising code configured to perform: receiving, by the network, an indicator from a user equipment (UE), wherein the indicator indicates the UE is substantially stationary; in response to receiving the indicator, transmitting a paging signal to the first network cell; receiving updated location information from the UE, wherein the updated location information indicates that the UE has moved from the first network cell to a second network cell; and in response to determining the UE has moved from the first network cell to the second network cell, transmitting the paging signal to the first network cell and the second network cell.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In a network environment, a terminal or user equipment (UE) executes a paging routine. A paging routine is a routine where the UE periodically listens to signals (e.g., paging calls) broadcasted from a network (e.g., a network backbone) attempting to establish an incoming connection to the UE. This paging routing may be executed while the UE is in a substantially stationary mode. As used herein, a substantially stationary mode is a mode when the UE has zero or minimal mobility or movement (e.g., less than a threshold mobility or movement). A connection between the UE and the network means that the UE may send and/or receive data from the network. As described herein, any process or function being performed by the network may be performed by the network backbone. The network environment referred to herein may be a 3$^{rd}$ Generation Partnership Project (3GPP) network environment.

The present invention is directed to initiating transmission of an indicator signal from a stationary UE to a network so that the network can transmit a paging signal to a specific cell associated with the stationary UE. In order to reduce the amount of signaling associated with a UE, a set of network cells are grouped together in tracking areas. As used herein, a network cell comprises at least two UE. In some embodiments, at least one UE in the cell acts as an access point (AP) that enables other UEs in the cell to connect to the network via the UE that acts as an AP. Each set of network cells comprises a different combination of UEs. Some UEs may be part of more than one network cell. When a UE is part of a network cell, this is referred to as the UE camping in that particular network cell. During the paging routine, the UE monitors the signal strength associated with each network cell in the set of network cells.

The UE may be part of a first network cell and not part of a second network cell. If the UE determines that the signal strength associated with the amount of signaling in the second network cell is lower than the signal strength associated with the amount of signaling in the first network cell, the UE will change its location so that it camps in the second network cell, and not in the first network cell. When the UE changes its location, the UE normally updates the network (e.g., the network backbone) with the changed location. However, if the second network cell is part of the same physical or geographical tracking area as the first network cell, the UE does not update the network with the changed location. This reduces the amount of control signaling between the UE and the network. The physical tracking area may be defined as a radius from a single point or defined by geographical coordinates (e.g., based on global positioning system (GPS) coordinates or other locating determining information such as Internet Protocol (IP) address information or distance from known base stations) associated with the UE.

A network may want to transmit a paging signal to a particular UE (e.g., a first UE). Generally, every cell located in a tracking area receives the paging signal from the network since the network does not know in which cell the UE is located. However, in a situation where the first UE's location is known and where the first UE is stationary for a certain period (e.g., the first UE does not move at all or the first UE's movement is less than a threshold amount of movement), the procedure of sending the paging signal to all cells in a tracking area is unnecessary. Therefore in order to reduce the total amount of paging overhead in a network system (comprising a plurality of network cells), the present invention is directed to paging a stationary UE that is located in or associated with a particular network cell.

Figure 1:
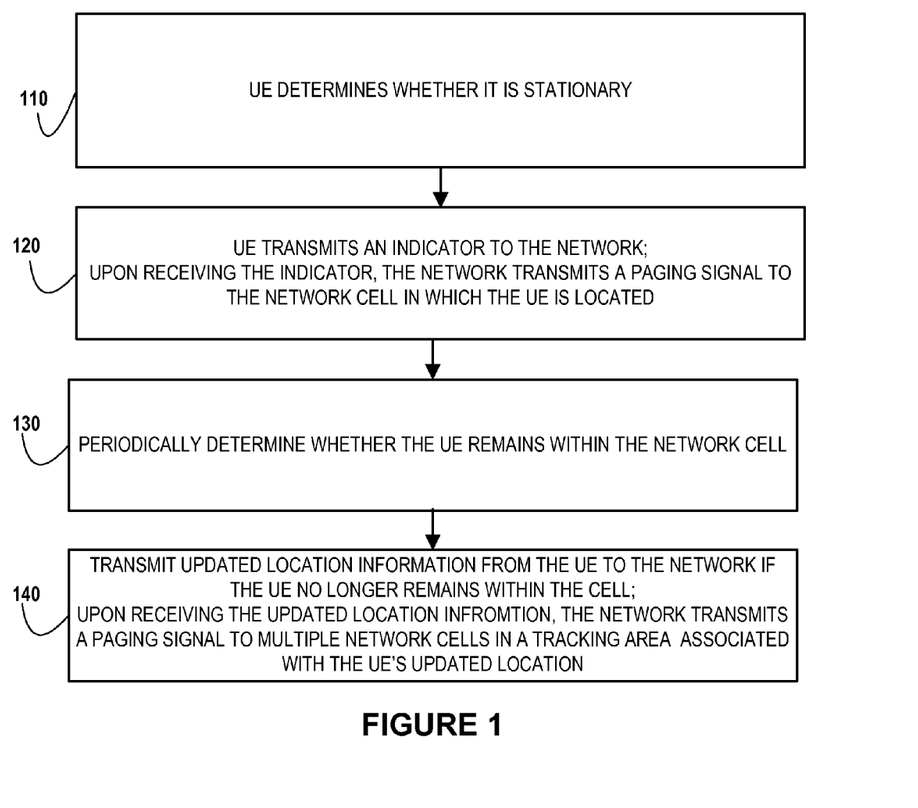
FIG. 1 presents an exemplary process flow for reducing paging overhead in a network, in accordance with embodiments of the present invention.

Referring now to FIG. 1, FIG. 1 presents a process flow for UE initiated paging overhead reduction. The UE is part of a network cell associated with a geographical tracking area that is tracked by a network. At block 110, the UE determines whether it is currently stationary and/or whether it will remain stationary for a certain period of time. At block 120, if the UE determines that it is currently stationary and/or it will remain stationary for a certain period of time, the UE transmits a cell paging indicator (or a "no mobility" indicator) to the network. At block 130, network receives the cell paging indicator from the UE. Upon receiving the indicator from the UE or at a time in the future when the network wants to send a paging signal, the network sends the paging signal to at least one of the UE from which the indicator was received or the network cell in which the UE is located. Therefore, the network does not send the paging signal to other network cells, thereby reducing the paging overhead associated with entire network system comprising a plurality of network cells. At block 140, the UE and/or the network determines whether the UE remains within the cell. This is periodically determined until a tracking area update (i.e., updated UE location information) is sent from the UE to the network, and is received by the network as indicated in block 150. If a tracking area update is received from the UE indicating that the UE is no longer stationary (e.g., the UE has moved outside the tracking area, is currently moving outside the tracking area, or will move out of the tracking area in the near future), the network returns to the configuration where the network transmits a paging signal to all network cells located in a tracking area.

The mobility of the UE may be monitored by the UE and if the UE moves outside the network cell, the UE sends updated information associated with the UE's location to the network. If the UE remains in the network cell, the UE does not send information associated with the UE's location to the network. In some embodiments, if the UE moves from the network cell to a second network cell, but the network cell is located in the same geographical area as the second network cell, the UE does not send information associated with the UE's updated location to the network. In other embodiments, if the UE moves from the network cell to the second network cell, and the network cell is located in the same geographical area as the second network cell, the UE still sends information associated with the UE's updated location to the network. In some embodiments, if the UE moves outside the network cell to a second network cell, and the network cell is located in a different geographical area from the second network cell, the UE sends information associated with the UE's updated location to the network. In other embodiments, the network monitors the location of the UE (including the cell in which the UE is located and the geographical area or location associated with the UE and/or the cell in which the UE is located) without receiving, from the UE, information associated with the UE's location.

Figure 2:
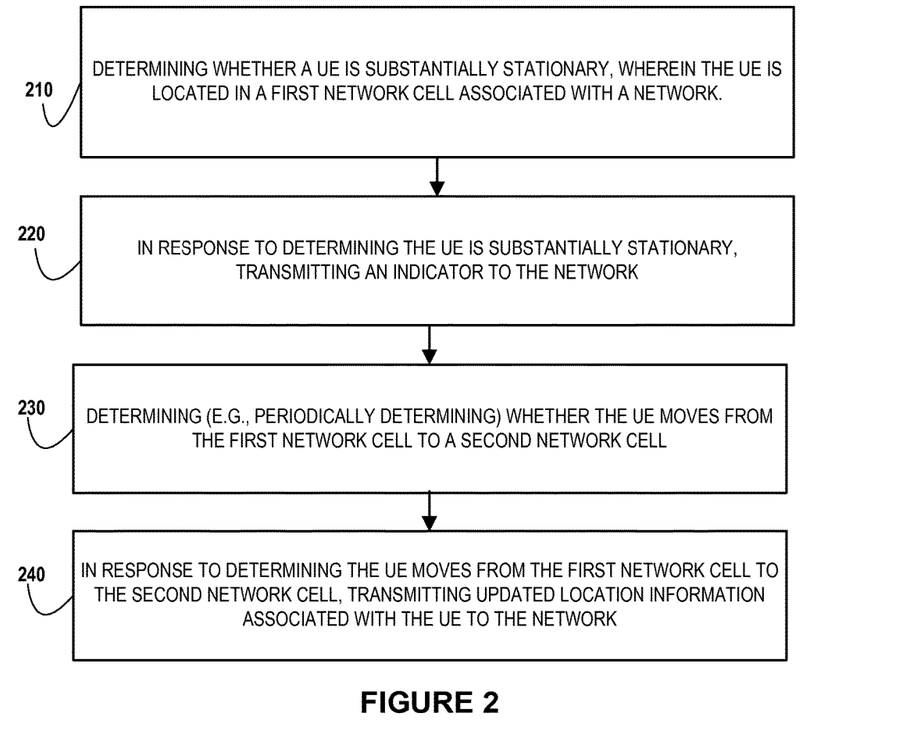
FIG. 2 presents another exemplary process flow for reducing paging overhead in a network, in accordance with embodiments of the present invention.

Referring now to FIG. 2, FIG. 2 presents a process flow for UE initiated paging reduction, from the perspective of a UE. At block 210, the process flow comprises determining whether a user equipment (UE) is substantially stationary, wherein the UE is located in a first network cell associated with a network. As used herein, a UE is substantially stationary if the UE is not moving, has limited movement less than a threshold movement, and/or will remain substantially stationary for a certain period, etc. At block 220, the process flow comprises in response to determining the UE is substantially stationary, transmitting an indicator to the network. At block 230, the process flow comprises determining (e.g., periodically determining) whether the UE moves from the first network cell to a second network cell, wherein the second network cell is associated with a different geographical area from the first network cell, or in other embodiments, is associated with the same geographical area as the first network cell. At block 240, the process flow comprises in response to determining the UE moves from the first network cell to the second network cell, transmitting updated location information associated with the UE to the network.

In some embodiments, determining whether the UE moves from the first network cell to the second network cell is performed by the UE and information associated with the determination is transmitted from the UE to the network. In other embodiments, the network tracks the location of the UE based on location coordinates (e.g., GPS coordinates, network coordinates (e.g., Internet Protocol (IP) coordinates), network base station coordinates (i.e., base station distances from the UE)). In such embodiments, the UE may not transmit information associated with its location to the network.

In some embodiments, the process flow further comprises determining whether the UE moves from the first network cell to a third network cell, wherein the third network cell is not associated with a different geographical area from the first network cell, and in response to determining the UE moves from the first network cell to the third network cell, not transmitting updated location information associated with the UE to the network. In other embodiments, the UE transmits updated location information to the network when it moves from the first network cell to the third network cell.

Figure 3:
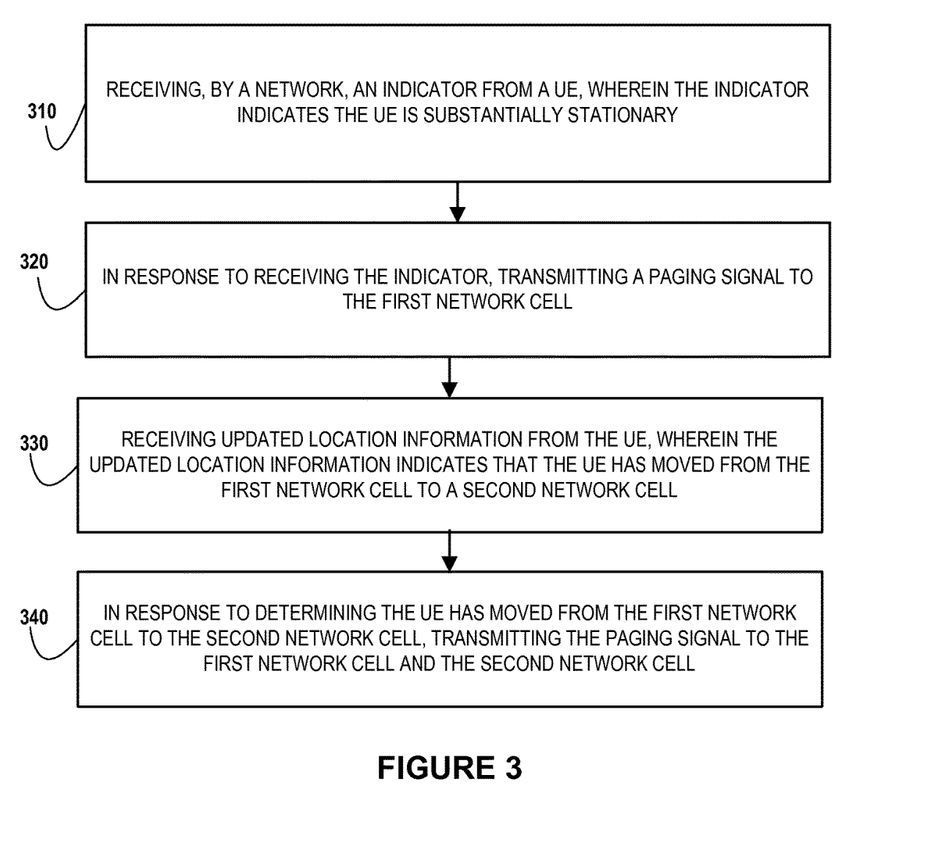
FIG. 3 presents another exemplary process flow for reducing paging overhead in a network, in accordance with embodiments of the present invention.

Referring now to FIG. 3, FIG. 3 presents a process flow for UE initiated paging reduction, from the perspective of a network. At block 310, the process flow comprises receiving, by the network, an indicator from a user equipment (UE), wherein the indicator indicates the UE is substantially stationary. At block 320, the process flow comprises in response to receiving the indicator, transmitting a paging signal to the first network cell. Therefore, the paging signal is transmitted from the network to the first network cell (and the UE located in the first network cell) when the UE is substantially stationary. In such embodiments, the paging signal is not transmitted to a second network cell that is located in a different geographical area from the first network cell, or that is located in the same geographical area as the first network cell.

At block 330, the process flow comprises receiving updated location information from the UE, wherein the updated location information indicates that the UE has moved from the first network cell to a second network cell (e.g., wherein the second network cell is associated with a different geographical area from the first network cell or is associated with the same geographical area as the first network cell). At block 340, the process flow comprises in response to determining the UE has moved from the first network cell to the second network cell, transmitting the paging signal to the first network cell and the second network cell.

In some embodiments, the process flow further comprises receiving updated location information from the UE, wherein the updated location information indicates that the UE has moved from the first network cell to a third network cell, wherein the third network cell associated with the same geographical area as the first network cell, and in response to determining the UE has moved from the first network cell to the third network cell, transmitting the paging signal to the geographical area associated with the first network cell and the third network cell so that the UE receives the paging signal from the network.

Figure 4:
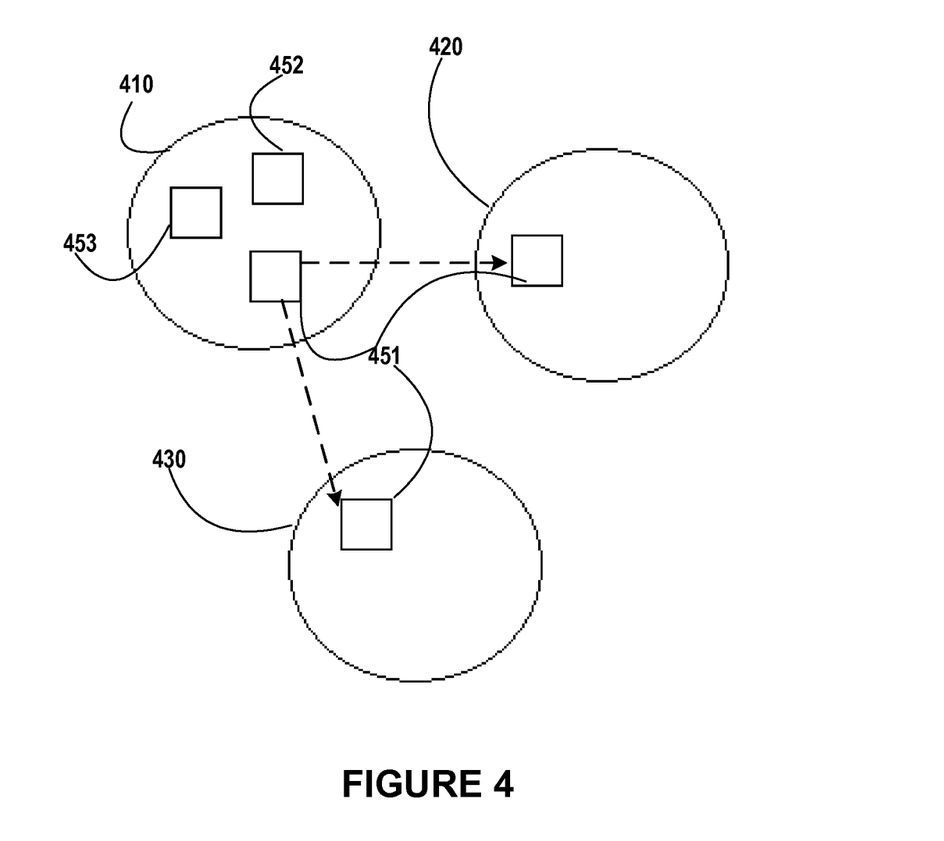
FIG. 4 presents another block diagram for reducing paging overhead in a network, in accordance with embodiments of the present invention.

Referring now to FIG. 4, FIG. 4 presents an exemplary block diagram for reducing paging overhead in a network, in accordance with embodiments of the present invention. FIG. 4 illustrates three network cells 410, 420, and 430. The first network cell comprises three UEs 451, 452, and 453. UE 451 may be a substantially stationary UE that sends an indicator the network (not shown), and in response to sending the indicator, the network transmits a paging signal to the network cell 410, but not to network cell 420, which is located in the same geographical area as network cell 410, and not to network cell 430, which is located in a different geographical area from network cell 410.

Once the network receives the indicator from UE 451, the network assumes that UE 451 will remain in network cell 410 until UE 451 sends updated information to the network indicating it has changed its cell. After a period of time, UE 451 may move from network cell 410 to network cell 420 or network cell 430. In some embodiments, the movement of UE 451 to another network cell is triggered by the physical movement of UE 451, while in other embodiments, the movement of UE 451 to another network cell is triggered based on other reasons (e.g., signal strength associated with network cell 420 or 430 being different from the signal strength associated with network cell 410). The movement triggers or prompts UE 451 to send updated location information associated with UE 451 to the network. Upon receiving the updated location information from UE 451, the network no longer sends a paging signal to just the network cell associated with UE 451, and instead sends the paging signal to all network cells associated with the geographical area in which UE 451 is located.

Figure 5:
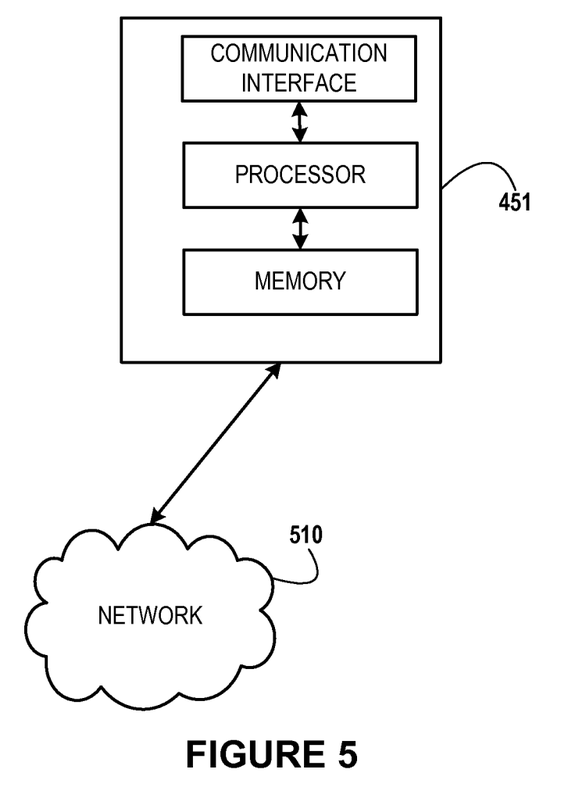
FIG. 5 presents an exemplary network environment reducing paging overhead in a network, in accordance with embodiments of the present invention.

Referring now to FIG. 5, FIG. 5 presents an exemplary block diagram of the network environment for reducing paging overhead in a network, in accordance with embodiments of the present invention. As illustrated, the network environment includes a network 510 and a UE 451. The network 510 comprises a network backbone. The UE 451 may be part of a network cell. As shown in FIG. 5, the UE 451 is operatively and selectively connected (e.g., via one or more wired or wireless mechanisms) to the network 510, which may include one or more separate networks.

The UE 451 is a computing device that comprises a communication interface, a processor, a memory, and a module stored in the memory, executable by the processor, and configured to perform the various processes described herein. In some embodiments, the network comprises a network backbone that comprises a communication interface, a processor, a memory, and a module stored in the memory, executable by the processor, and configured to perform the various processes described herein. Each communication interface described herein enables communication with the network 510 and other systems via the network 510.

Each processor described herein generally includes circuitry for implementing audio, visual, and/or logic functions. For example, the processor may include a digital signal processor device, a microprocessor device, and various analog-to-digital converters, digital to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The invention is not limited to any particular types of systems or devices that can take the form of UE. As used herein, a device or UE may also be referred to as a system or apparatus. Examples of UEs include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable or non-portable computing or non-computing devices such as servers or routers. In some embodiments, the UE is a non-mobile or non-portable device (e.g., water meter reader, smart grid device, etc.).

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for reducing paging overhead in a network, the method comprising:
    determining that a user equipment (UE) will remain substantially stationary for a period of time, wherein the UE is located in a first network cell associated with the network; and
    in response to determining the UE will remain substantially stationary for a period of time, transmitting, from the UE, an indicator to the network, wherein the indicator indicates that the UE is substantially stationary and, wherein the network responds to the indicator by transmitting a paging signal to the first network cell without transmitting the paging signal to one or more other network cells that are part of a same geographic tracking area as the first network cell.

2. The method of claim 1, further comprising determining whether the UE moves from the first network cell to a second network cell.

3. The method of claim 2, wherein determining whether the UE moves from the first network cell to the second network cell comprises periodically determining whether the UE moves from the first network cell to the second network cell.

4. The method of claim 2, wherein determining whether the UE moves from the first network cell to the second network cell comprises determining, by the UE, whether the UE moves from the first network cell to the second network cell.

5. The method of claim 2, wherein determining whether the UE moves from the first network cell to the second network cell comprises determining, by the network, whether the UE moves from the first network cell to the second network cell.

6. The method of claim 2, further comprising, in response to determining that the UE moves from the first network cell to the second network cell, transmitting updated location information associated with the UE to the network.

7. The method of claim 6, wherein the network transmits a paging signal to the first network cell and the second network cell when the UE moves from the first network cell to the second network cell.

8. The method of claim 1, wherein the network comprises a network backbone.

9. The method of claim 1, wherein the UE is substantially stationary if the UE is not moving or has limited movement.

10. The method of claim 1, wherein the second network cell is associated with the same or different geographical area when compared to the first network cell.

11. The method of claim 1, further comprising:
    determining whether the UE moves from the first network cell to a third network cell, wherein the third network cell is not associated with a different geographical area from the first network cell; and
    in response to determining the UE moves from the first network cell to the third network cell, not transmitting updated location information associated with the UE to the network.

12. The method of claim 1, wherein the network is associated with the 3rd Generation Partnership Project (3GPP).

13. The method of claim 1, wherein the UE comprises a mobile device.

14. A method for reducing paging overhead in a network, the method comprising:
- receiving, by the network, an indicator from a user equipment (UE), wherein the indicator is transmitted by the UE in response to determining that the UE will remain substantially stationary for a period of time and indicates the UE is substantially stationary within a first network cell associated with the network; and
- in response to receiving the indicator, transmitting a paging signal to the first network cell without transmitting the paging signal to one or more other network cells that are part of a same geographic tracking area as the first network cell.

15. The method of claim 14, further comprising receiving updated location information from the UE, wherein the updated location information indicates that the UE has moved from the first network cell to a second network cell.

16. The method of claim 15, further comprising, in response to determining the UE has moved from the first network cell to the second network cell, transmitting the paging signal to the first network cell and the second network cell.

17. A system for reducing paging overhead in a network, the system comprising:
- a user equipment located in a first network cell of the network; and
- a base station configured to (i) receive an indicator from the user equipment (UE) that is transmitted in response to determining that the UE will remain substantially stationary for a period of time and indicates the UE is substantially stationary, and (ii) in response to receiving the indicator, transmit a paging signal to the first network cell without transmitting the paging signal to one or more other network cells that are part of a same geographic tracking area as the first network cell.

* * * * *